United States Patent [19]
Boie

[11] Patent Number: 5,444,493
[45] Date of Patent: Aug. 22, 1995

[54] METHOD AND APPARATUS FOR PROVIDING INTRA-FIELD INTERPOLATION OF VIDEO SIGNALS WITH ADAPTIVE WEIGHTING BASED ON GRADIENTS OF TEMPORALLY ADJACENT FIELDS

[75] Inventor: Werner Boie, Strasbourg, Germany

[73] Assignee: Deutsche Thomson-Brandt GmbH, Villingen-Schwenningen, Germany

[21] Appl. No.: 81,414

[22] Filed: Jun. 22, 1993

[30] Foreign Application Priority Data

Jun. 22, 1992 [EP] European Pat. Off. ............ 92401745

[51] Int. Cl.$^6$ ............................................. H04N 7/01
[52] U.S. Cl. ................................. 348/448; 348/452; 348/910
[58] Field of Search ............... 348/448, 452, 910, 911; H04N 7/01

[56] References Cited

U.S. PATENT DOCUMENTS

| 4,937,667 | 6/1990 | Choquet et al. | 348/448 |
| 4,941,045 | 7/1990 | Birch | 348/448 |
| 5,027,201 | 6/1991 | Bernard | 348/452 X |
| 5,081,532 | 1/1992 | Rabii | 348/452 |
| 5,175,619 | 12/1992 | Willis | 348/452 X |
| 5,260,786 | 11/1993 | Kawashima et al. | 348/452 |

FOREIGN PATENT DOCUMENTS 0169527 1/1986 European Pat. Off. .
0227190 7/1987 European Pat. Off. .

Primary Examiner—Victor R. Kostak
Attorney, Agent, or Firm—Joseph S. Tripoli; Peter M. Emanuel; Richard G. Coalter

[57] ABSTRACT

Visual artifacts, normally characteristic of interpolated images, are minimized by a method of adaptive interpolation in which pixel values of a current line to be interpolated are determined from respective values of vertically adjacent pixels of adjacent lines in a current field. The values are adaptively weighted according to one or more gradients of respectively located pixel values of one or more temporally adjacent fields thereby providing an interpolated image having improved sharpness, no temporal lag, and no switching artifacts.

7 Claims, 3 Drawing Sheets

METHOD AND APPARATUS FOR PROVIDING INTRA-FIELD INTERPOLATION OF VIDEO SIGNALS WITH ADAPTIVE WEIGHTING BASED ON GRADIENTS OF TEMPORALLY ADJACENT FIELDS

FIELD OF THE INVENTION

This invention relates to video systems generally and particularly to methods and apparatus for providing adaptive interpolation of television signals.

BACKGROUND OF THE INVENTION

Spatial progressive scan converted interlace pictures provide reduced visibility of horizontal line structure in displayed images by doubling the number of lines displayed per field. Typically, the "extra" lines for display are obtained by some form of interpolation of the transmitted lines by means of an interlace-to-progressive scan converter. Such converters may tend to exhibit, in general, unsharp vertical transitions along horizontal structures and show only an insignificant reduction of interlace flicker. This is normally due to the use of vertical interpolation or a simple vertical average over two lines applied at horizontal structures. One result of that kind of "up-conversion" is very often that the original interlace pictures may look better than the up-converted ones for certain images being displayed. Generally speaking, conventional spatio-temporal up-conversion algorithms are effective only over a relatively limited range of velocities of moving objects. For greater velocities these algorithms may tend to produce an intolerable temporal lag making the contours of the moving objects rather unsharp. Many proposals exist which employ a combination of different optimized processing modes for moving or still picture parts in an attempt to overcome motion artifacts but the included motion detector problems have not been completely solved up to now.

SUMMARY OF THE INVENTION

The present invention is directed, in general respects, to meeting the need for methods and apparatus for providing adaptively weighted interpolation in which problems characteristic of motion detection can be avoided.

In accordance with an aspect of the invention, an adaptively weighted vertical interpolation is used which depends on the estimated 5position of the vertical transition in the picture. For that reason, the information of the preceding and/or succeeding field of the interlace signal is taken into account. That allows a significantly improved sharpness and a drastic reduction of interlace flicker for at least still picture parts. Also in moving picture parts a significant improvement of sharpness is possible. More specifically, in the present invention the missing lines of an interlace field are calculated by an adaptively weighted vertical interpolation by means of only two adjacent lines in the current field. The interpolation allows only for the interpolated values to be within the amplitude range between two adjacent lines of the interlace field. The main task of this kind of interpolation process consists therefore of finding two proper weighting factors. Advantageously the weighting factors are calculated or estimated by means of the information of the adjacent fields.

A method of interpolation, in accordance with the principles of the present invention, comprises adaptive interpolation in which pixel values of a current line to be interpolated are determined from respective values of vertically adjacent pixels of adjacent lines of a current field, and the values of the adjacent pixels are adaptively weighted according to at least one gradient of respectively located pixel values of at least one temporally adjacent field for calculating the pixel values of the lines to be interpolated.

Apparatus embodying the invention comprises first means for calculating corrected gradients from respectively delayed values of input pixels under the control of a gradient of a current field, second means for calculating this gradient from respectively delayed input pixel values, an arithmetic circuit for calculating weighting factors under the control of the gradient of the current field from the corrected gradients and third means for calculating the pixel values for the current line from respectively delayed input pixel values under the control of the weighting factors.

The up-conversion (interpolation) provided by the present invention has several advantages over other known spatio-temporal or motion adaptive up-conversion techniques. A few of these advantages are as follows:

(i) Since only two pixels of the two adjacent lines of the interlace field are involved in the up-conversion filter no temporal lag can arise. The full sharpness of moving objects will be preserved.

(ii) The evaluation of the weighting factors is a continuous process. Neither hard decisions like in the known "DIAG3X" interpolation algorithm described in EP-A-92400762 nor non-linearities with discontinuities can occur. This approach ensures per sea better noise immunity.

(iii) Only one processing method is needed. This avoids the need of a motion detector and all the problems accompanied by it. For that reason switching artifacts like busy edges, impairments in combing, halo effects, mixed modes, etc. will not arise.

(iv) The present interpolator allows a high vertical sharpness. The processed pictures can lead even to the impression of a transmitted progressively scanned picture picked up with a fine spot. In contrast to that, interlace pictures are normally generated with a larger spot size so that even after field insertion the complete frame cannot look as sharp as the progressively scanned one.

(v) If, in the worst case, the weighting factors were to be evaluated completely in error, only some line repetition artifacts would be produced.

It will be noted that the relatively high vertical resolution which may be obtained by temporal interpolation (e.g., a simple field insertion technique) really applies only for still pictures since motion detector artifacts become a factor for moving pictures (i.e., relatively high vertical frequencies in a temporal interpolator can lead to serious motion detector problems and associated visual artifacts.) If the high vertical frequencies; in the pictures cannot be up-converted correctly interlace flicker will remain. The vertical interpolation method of the present invention may thus be regarded as being less critical compared with the distortions caused by a wrong decision of a motion detector. This is of particular advantage when one considers that in a typical television production all of the picture or much of it will generally be in motion. Therefore it is more worthwhile improving the quality of moving images.

BRIEF DESCRIPTION OF THE DRAWING

The foregoing and further features of the invention are described herein by way of example and shown herein in the accompanying drawing.

DETAILED DESCRIPTION

As already mentioned above, the adaptive vertical interpolation of the present invention relies upon "blending" or combining the pixels of two lines of the same field that are vertically adjacent to the line being interpolated. This interpolation processing may be represented (with simplified notation) by the following expression:

$$Y^*(y,t) = [\alpha \cdot Y(y-d, t) + \beta \cdot Y(y+d, t)]/(\alpha+\beta). \quad (1)$$

In expression (1) the term $Y^*(y,t)$ represents the value of the luminance signal Y at a vertical position y (e.g., a given line) and at a particular time "t" (e.g., a given position on a line). The term $Y(y-d, t)$ represents the amplitude of the previous pixel on the preceding line (e.g., a vertically adjacent line). The term $Y(y+d,t)$ represents the luminance level of the vertically adjacent pixel of the following line. The terms $\alpha$ and $\beta$ are weighting functions that determine the proportions of the vertically adjacent pixels which are "blended" to arrive at the value of the interpolated pixel.

Figure 1:
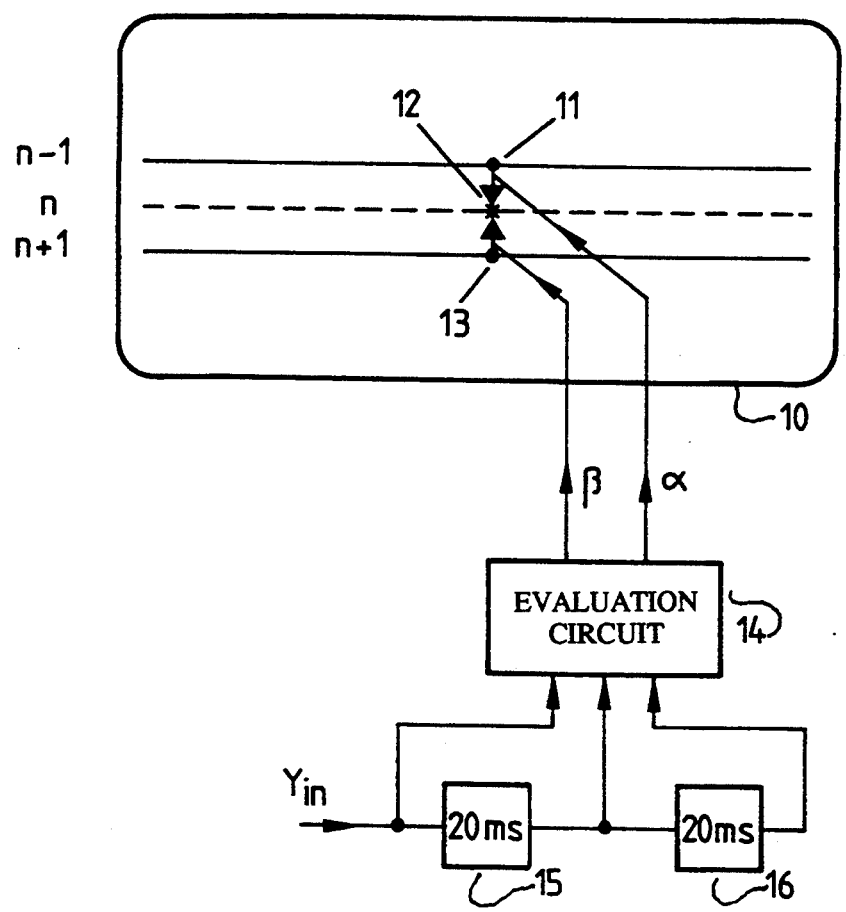
FIG. 1 is a block diagram of an interpolation system embodying: principles of the invention.

In more detail, the vertical interpolation is controlled by two weighting factors $\alpha$ and $\beta$ which themselves depend on the picture information of the current and the (two) adjacent field(s). FIG. 1 gives an overview of the principal processing. On a display 10 in FIG. 1 three lines n−1, n (to be interpolated) and n+1 are depicted. Pixel 12 on line "n" is to be interpolated from pixel 11 of line n−1 and from pixel 13 of line n+1. The values of luminance input pixels Yin and such values having been delayed in a first field store 15 and such values having been further delayed in a second field store 16 are fed to an evaluation circuit 14 in which the weighting factors $\alpha$ and $\beta$ are calculated.

Figure 2A:
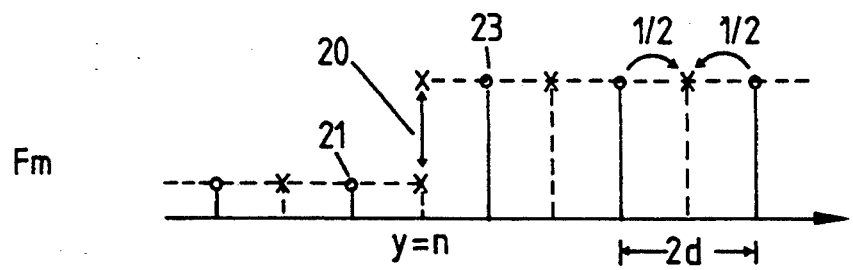
FIGS. 2A and 2B are spatial picture element ("pixel" hereafter) diagrams illustrating evaluation of weighting factors in the operation of the system of FIG. 1.
Figure 2B:
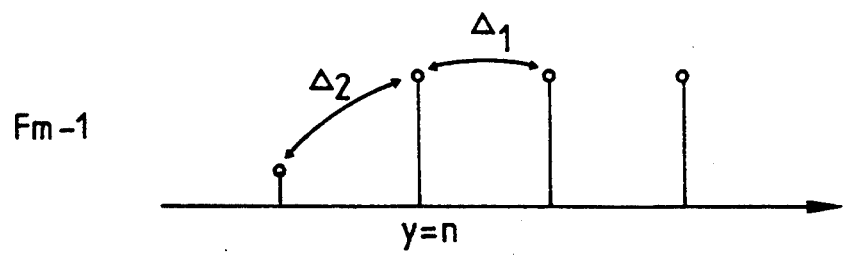

FIG. 2 illustrates the evaluation of the weighting factors $\alpha$ and $\beta$. In FIG. 2A a vertical transition at y=n in an interlace field Fm is shown. In the transition region 20 one will find a range of uncertainty in which the pixel value of the missing line n could exist. This region of uncertainty can be significantly reduced by means of the information of the previous field Fm−1 provided that there is no movement in this picture part. By measuring the vertical gradient $\Delta_1$ in the upper and the vertical gradient $\Delta_2$ in the lower direction in this field Fm−1 with respect to the line y=n to be interpolated (see FIG. 2B) these gradients may be used to determine the weighting factors ($\alpha$ and $\beta$)that determine the proportions of pixels 11 and 13 that are combined to provide the interpolated pixel 12.

Expressed mathematically, the gradients $A_{1a}$ and $A_{2a}$ may be expressed as:

$$\Delta_{1a} = Y(y+2d, t-T_t), Y(y, t+T_t), \text{ and} \quad (2)$$

$$\Delta_{2a} = Y(y, t-T_t) - Y(y-2d, t-T_t), \quad (3)$$

wherein $T_t$ is the field period (e.g., 20 ms for 50 Hz systems) and the term 2d is the line distance within a field. The gradients are used for evaluation of the weighting factors in accordance with the following relationships:

$$\alpha = |\Delta_{1a}| + \epsilon \text{ and} \quad (4)$$

$$\beta = |\Delta_{2a}| + \epsilon.$$

In these formulas $\epsilon$ represents only a small figure, e.g. 1 LSB, just to provide a reasonable result if the gradients $\Delta_1$ and $\Delta_2$ become zero.

Figure 3A:
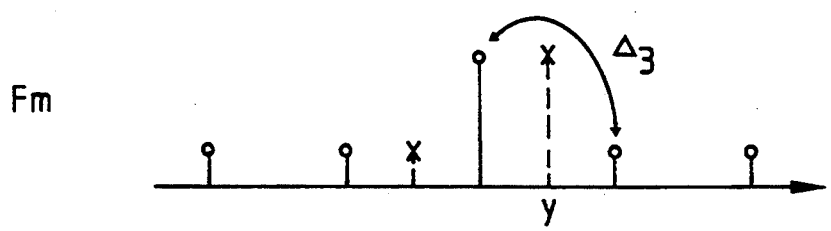
FIGS. 3A and 3B are spatial pixel diagrams illustrating processing of fine vertical detail in the system of FIG. 1.
Figure 3B:
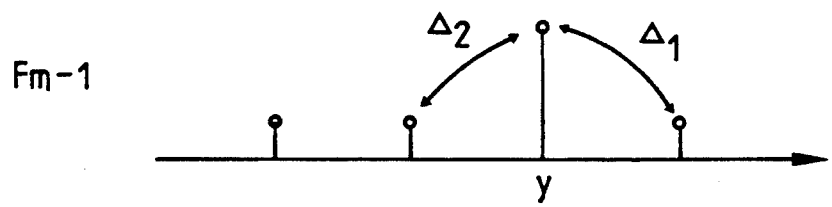

The finest vertical detail, which can be processed correctly by this technique, is given by a width of two lines as it is illustrated in FIGS. 3A and 3B. For a correct interpolation a modification or "correction" may be introduced which forces $\Delta_1$ or $\Delta_2$ to zero if a sign of these gradients is different from the sign of the gradient $\Delta_3$ in the current field which is the difference between the vertically adjacent pixels as shown in FIG. 3A. Mathematically, the value of gradient 3 ($\Delta_3$) is given by:

$$\Delta_3 = Y(y+d) - Y(y-d, t) \quad (5)$$

The modification comprises determining the sign of gradient 3. If the sign is positive (e.g., $\Delta_3 \geq 0$) then gradients 1 and 2 are selected in accordance with the following relationships:

$$\Delta_{1a} = \text{Minimum}(\Delta_{1a}, 0) \quad (6)$$

$$\Delta_{2a} = \text{Maximum}(\Delta_{2a}, 0) \quad (7)$$

Conversely, If the sign is negative, the gradient values are modified or "corrected" as follows:

$$\Delta_{1a} = \text{Minumum}(\Delta_{1a}, 0) \quad (8)$$

$$\Delta_{2a} = \text{Minimum}(\Delta_{2a}, 0) \quad (9)$$

Figure 4A:
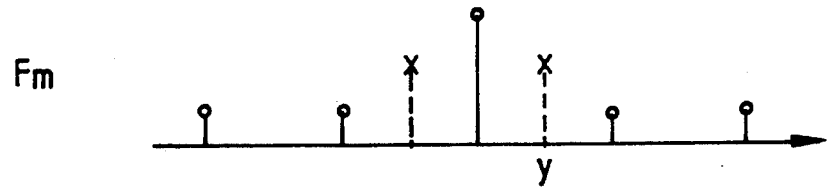
FIGS. 4A and 4B are spatial pixel diagrams illustrate a limiting condition of the processing of the finest vertical detail by the system of FIG. 1.
Figure 4B:
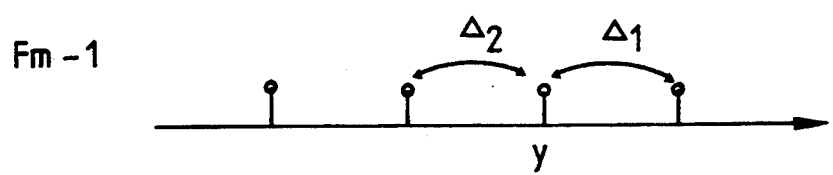

In case of finer vertical detail the adaptive interpolation of the present invention converges to a simple vertical average as it is depicted in FIG. 4A and 4B. In the given situation both gradients $\Delta_1$ and $\Delta_2$ become zero.

Tests of this algorithm have turned out a significantly improved sharpness, but for some certain movements a staircase structure with a step size of two lines can come up (line repetition artefact). This artefact was found mainly due to the asymmetric temporal evaluation of $\alpha$ and $\beta$. Therefore the processing is advantageously extended also in the other temporal direction (field Fm+1) in which a second set $\Delta_1$ and $\Delta_2$ is evaluated according to the formula.

$$\Delta_{1b} = Y(y+2d, t+T_t) - Y(y, t+T_t), \text{ and} \quad (10)$$

$$\Delta_{2b} = Y(y, t+T_t) - Y(y-2d, t+T_t \quad (11)$$

with the same modification depending on $\Delta_3$. The weighting factors are then given by:

$$\alpha = |\underline{\Delta}_{1a}| + |\underline{\Delta}_{1b}| + \epsilon \text{ and} \qquad (12)$$

$$\beta = |\underline{\Delta}_{2a}| + |\underline{\Delta}_{2b}| + \epsilon. \qquad (13)$$

The results of this further modification of the adaptive interpolation process have indicated that the motion portrayal is better by the symmetrical temporal evaluation of $\alpha$ and $\beta$, but may still be some staircase artifacts along certain moving diagonal structures. Different solutions are possible to overcome these distortions. A detection of a moving diagonal structure or a pattern recognition of the staircases in the reconstructed frame would be quite helpful, but rather complex.

A simpler solution, in accordance with a further feature of the invention, is to force the adaptive interpolation softly to a vertical average depending on the movement. An indication of movement is already given by the changing gradient $\Delta_1$ and $\Delta_2$ from frame to frame so that a motion indicating factor can be specified by:

$$\sigma = [|\Delta_{1a} - \Delta_{1b}| + |\Delta_{2a} - \Delta_{2b}|] / \text{Maximum } (\Sigma|\Delta_i|, \delta), \qquad (14)$$

with $\Sigma|\Delta_i| = |\Delta_{1a}| + |\Delta_{1b}| + |\Delta_{2a}| + |\Delta_{2b}|$, $\delta = 1$ LSB. $\qquad (15)$ The weighting factors then become:

$$\alpha = (1-\sigma)(|\underline{\Delta}_{1a}| + |\underline{\Delta}_{1b}|) + \sigma^* \Sigma|\underline{\Delta}_i| + \epsilon \qquad (16)$$

$$\beta = (1-\sigma)(|\underline{\Delta}_{2a}| + |\underline{\Delta}_{2b}|) + \sigma^* \Sigma|\underline{\Delta}_i| + \epsilon \qquad (17)$$

For a better noise immunity and for an improved efficiency a second term is introduced in these equations in order to force the weighting coefficients stronger to a balance. For the same reason $\epsilon$ has been increased to five in an 8 bit processing scheme.

Figure 5:
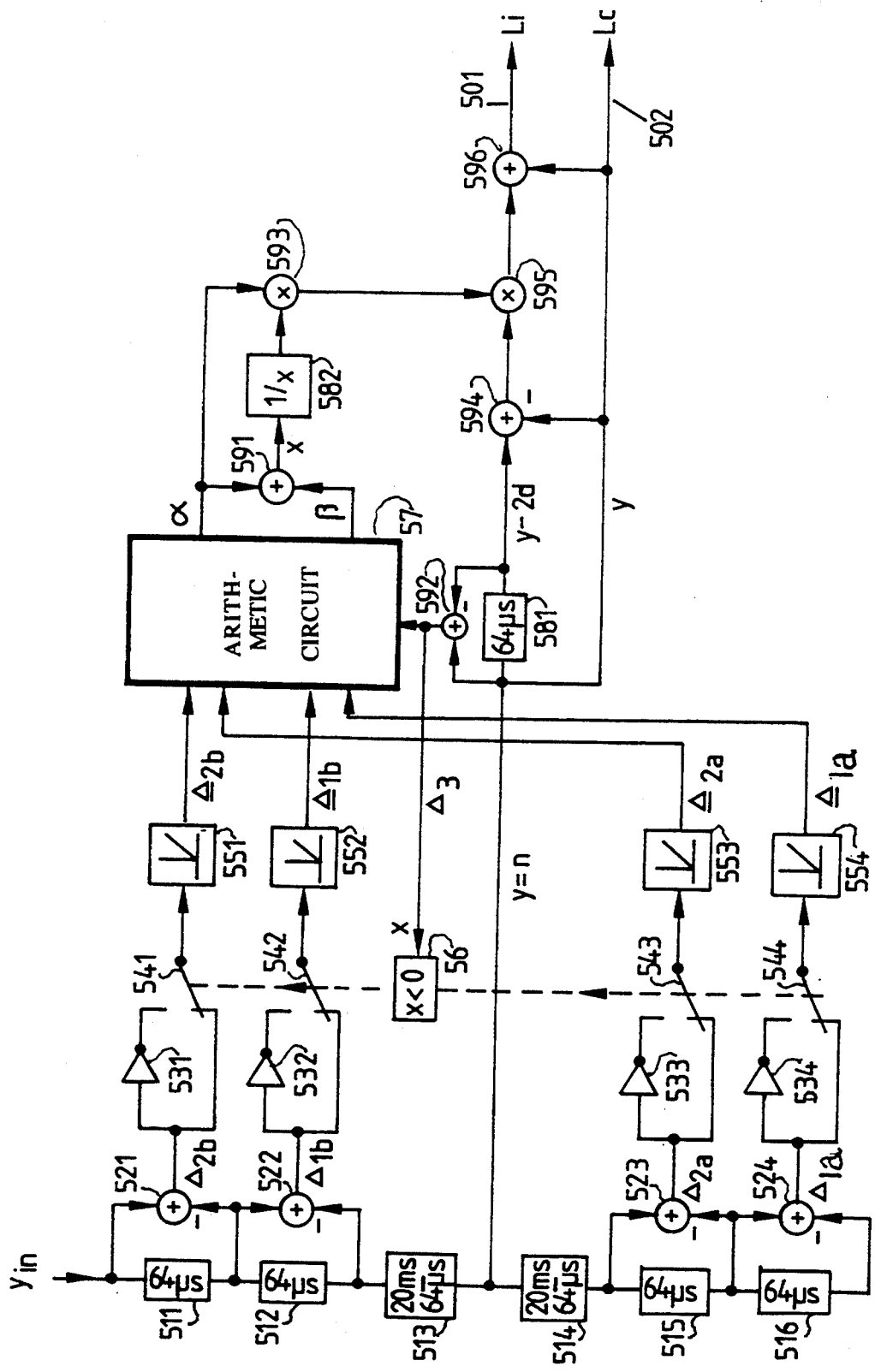
FIG. 5 is a detailed block diagram of an interpolator embodying the invention.

FIG. 5 shows the block diagram for an interpolator using the described method of the invention. The values of luminance input pixels Yin are fed to a first subtractor 521 and are passed through a first line delay 511, a second line delay 512, a first field-minus-line delay 513, a second field-minus-line delay 514 and a third line delay 515 to a fourth line delay 516. The output of the first line delay 511 is subtracted in the first subtractor 521 from the input of this line delay. The output of the second line delay 512 is subtracted in a second subtracter 522 from the input of this line delay.

The output of the third line delay 515 is subtracted in a third subtractor 523 from the input of this line delay. The output of the fourth line delay 516 is subtracted in a fourth subtractor 524 from the input of this line delay. The output signal $\Delta_{2b}$ of the first subtractor 521 is either directly or via a first inverter 531 passed through a first switch 541 and a first limiter 551 (output signal $\underline{\Delta}_{2b}$) to an arithmetic circuit 57 for calculating $\alpha$ and $\beta$. The output signal $\Delta_{1b}$ of the second subtractor 522 is either directly or via a second inverter 532 passed through a second switch 542 and a second limiter 552 (output signal $\underline{\Delta}_{1b}$) to the arithmetic circuit 57. The output signal $\Delta_{2a}$ of the third subtractor 523 is either directly or via a third inverter 533 passed through a third switch 543 and a third limiter 553 (output signal $\underline{\Delta}_{2a}$) to the arithmetic circuit 57. The output signal $\Delta_{1a}$ of the fourth subtractor 524 is either directly or via a fourth inverter 534 passed through a fourth switch 544 and a fourth limiter 554 (output signal $\underline{\Delta}_{1a}$) to the arithmetic circuit 57.

At the output of the first field-minus-line delay 513 the pixel values of the current line (y=n, Lc) are available and fed to output 502. These pixels are also passed through a fifth line delay 581, a fifth subtractor 594, a first multiplier 595 and a first adder 596 to out 501 which outputs pixel values of the interpolated line Li. The output of the fifth line delay is subtracted in a sixth subtractor 592 from the input of this line delay. The output of this subtractor represents the gradient $\Delta_3$ of the current field and is also fed to the arithmetic circuit 57 and to a switch control 56 which controls simultaneously the four switches. In the arithmetic circuit 57 the weighting factors $\alpha$ and $\beta$ are calculated from the described input signals, with or without usage of the motion indication factor $\sigma$.

For calculating Y* the formula $(a^*A + b^*B)/(a+b)$ can be changed to:

$$= (a^*A + b^*B + a^*B - a^*B/(a+b)) \qquad (18)$$
$$= (a(A-B) + (a+b)B)/(a+b) \qquad (19)$$
$$= (a/(a+b))^*(A-B) + B. \qquad (20)$$

The latter expression can be used advantageously to calculate the interpolated pixel values 11. The $\alpha$ and $\beta$ outputs of arithmetic circuit 57 are added in a second adder 591. The adder output passes through a reciprocal value circuit 582 and becomes multiplied in a second multiplier 593 with value $\alpha$. The output of this multiplier delivers the second input for the first multiplier 595. The input of the fifth line delay 581 is subtracted from the output of this line delay in the fifth subtractor 594 and is added in the first adder 596 to the output of the first multiplier 595.

Various changes may be made to the embodiments of the invention herein shown and described. For example, more than two directly vertically adjacent pixels can be used for the inventive interpolation.

It will be appreciated that the adaptive interpolator of the present invention is of general utility and may readily be applied to diverse applications such as television receivers, video cassette recorders and to studio equipment such as video standards converters and the like. The principles also apply to the processing of chrominance signals.

The results of the inventive interpolation have shown that the enhancement of sharpness and the interlace flicker reduction is very obvious in picture sequences which contain a zoom of fine details. In test charts like the 'Philips test chart' the interlace flicker can be completely removed.

The herein described adaptive vertical interpolation method and apparatus provide a significantly improved picture sharpness and interlace flicker reduction compared with the so-called "DIAG3X" interpolation algorithm described in EP-A-92400762. Additionally, the described adaptive interpolator offers a very sensible compromise between hardware complexity, vertical resolution, vertical sharpness and remaining artifacts. Moreover, the picture quality has not beed found to be compromised by new artefacts introduced by the up-conversion algorithm.

What is claimed is:

1. A method for adaptive interpolation of intermediate lines in a current field, comprising:

calculating a current pixel value of a current intermediate video line to be interpolated from respective values of only the vertically adjacent pixels on either side of the adjacent lines of the current field; and adaptively weighting the values of said vertically adjacent pixels according to at least two gradients of horizontally respectively located pixel values of at least the temporally preceeding adjacent field for calculating said current pixel value;

calculating the lower of said two gradients from the difference between the value of the pixel having the vertical position of said current pixel and the value of the vertically lower adjacent original pixel; and calculating the upper of said two gradients from the difference between the value of the vertically upper adjacent original pixel and the value of the pixel having the vertical position of said current pixel.

2. A method as recited in claim 1, further comprising:

calculating a weighting factor related to the upper pixel of the current field by adding to the sum of the absolute values of the upper gradient of the temporally preceding and of the temporally following fields a value $\epsilon$; and calculating a weighting factor related to the lower pixel of the current field by adding to the sum of the absolute values of the lower gradient of the temporally preceding and of the temporally following field the value $\epsilon$, $\epsilon$ having a value of about 1-5 LSB in an eight bit processing.

3. A method as recited in claim 1, further comprising:

calculating a weighting factor related to the upper pixel of the current field by adding to the absolute value of the upper gradient a value $\epsilon$ and calculating a weighting factor related to the lower pixel of the current field by adding to the absolute value of the lower gradient the value $\epsilon$, $\epsilon$ having a value of about 1-5 LSB in an eight bit processing.

4. A method as recited in claim 1, 3 or 2, further comprising:

correcting said gradients under the control of the sign of a further gradient between the upper and the lower of said vertically adjacent pixels of the current field.

5. Apparatus for adaptively interpolating pixel values of intermediate lines in a current field, comprising:

first means for calculating a current pixel value of a current intermediate video line to be interpolated from respective values of only the vertically adjacent pixel on either side of the adjacent lines of the current field;

second means for adaptively weighting the values of said adjacent pixels according to at least two gradients of horizontally respectively located pixel values of at least the temporally preceding adjacent field for calculating said current pixel value;

an arithmetic circuit for calculating the lower of said two gradients from the difference between the value of the pixel having the vertical position of said current pixel and the value of the vertically lower adjacent original pixel and for calculating the upper of said two gradients from the difference between the value of the vertically upper adjacent original pixel and the value of the pixel having the vertical position of said current pixel and;

third means for correcting said gradients under the control of the sign of a further gradient between the upper and the lower of said vertically adjacent pixels of the current field.

6. Apparatus as recited in claim 5 wherein:

a weighting factor related to the upper pixel of the current field is calculated by adding to the absolute value of the upper gradient a value $\epsilon$;

a weighting factor related to the lower pixel of the current field is calculated by adding to the absolute value of the lower gradient the value $\epsilon$, and wherein the value $\epsilon$ is selected to be of about 1-5 LSB in an eight bit processing.

7. Apparatus as recited in claim 5 wherein:

a weighting factor related to the upper pixel of the current field is calculated by adding to the sum of the absolute values of the upper gradient of the temporally preceding and of the temporally following field a value $\epsilon$;

a weighting factor related to the lower pixel of the current field is calculated by adding to the sum of the absolute values of the lower gradient of the temporally preceding and of the temporally following field the value $\epsilon$; and the value $\epsilon$ having a value of about 1-5 LSB in an eight bit processing.

* * * * *